(12) United States Patent
Revilla López et al.

(10) Patent No.: US 10,752,182 B2
(45) Date of Patent: Aug. 25, 2020

(54) QUARTER TURN CLIP FOR CONNECTING A VEHICLE METAL SHEET PLATE AND AN EXPANDED POLYPROPYLENE VEHICLE PANEL AND QUARTER TURN CLIP AND EXPANDED POLYPROPYLENE VEHICLE PANEL ASSEMBLY

(71) Applicant: GRUPO ANTOLÍN-INGENIERÍA, S. A., Burgos (ES)

(72) Inventors: Fernando Revilla López, Burgos (ES); Andrés Cristóbal Aragón, Burgos (ES)

(73) Assignee: GRUPO ANTOLÍN-INGENIERÍA, S. A., Burgos (ES)

( * ) Notice: Subject to any disclaimer, the term of this patent is extended or adjusted under 35 U.S.C. 154(b) by 135 days.

(21) Appl. No.: 16/021,328

(22) Filed: Jun. 28, 2018

(65) Prior Publication Data
US 2019/0009736 A1 Jan. 10, 2019

(30) Foreign Application Priority Data
Jul. 7, 2017 (EP) .................................... 17382444

(51) Int. Cl.
*B60R 13/02* (2006.01)
*F16B 5/06* (2006.01)
*F16B 21/02* (2006.01)
*F16B 19/00* (2006.01)

(52) U.S. Cl.
CPC ........ *B60R 13/0206* (2013.01); *F16B 5/0642* (2013.01); *F16B 19/008* (2013.01); *F16B 21/02* (2013.01); *B60R 2013/0293* (2013.01); *F16B 2005/0671* (2013.01)

(58) Field of Classification Search
CPC ......... B60R 13/0206; B60R 2013/0293; F16B 19/008; F16B 2005/0671; F16B 21/02; F16B 5/0642
See application file for complete search history.

(56) References Cited

U.S. PATENT DOCUMENTS 2,258,668 A * 10/1941 Zahodiakin ............... F16B 5/10
411/554
4,936,066 A * 6/1990 Rutsche .................... F16B 5/10
52/238.1
6,237,970 B1 * 5/2001 Joannou ............... E05B 65/006
292/241

(Continued)

FOREIGN PATENT DOCUMENTS

| DE | 10 2013 006720 A1 | 10/2014 |
|---|---|---|
| EP | 1 870 602 A1 | 12/2007 |
| WO | 2007/065520 A1 | 6/2007 |

OTHER PUBLICATIONS

Jan. 17, 2018—(EP) European Search Report—App EP 17 38 2444.

*Primary Examiner* — Robert Sandy
*Assistant Examiner* — David M Upchurch
(74) *Attorney, Agent, or Firm* — Banner & Witcoff, Ltd.

(57) ABSTRACT

Quarter turn clip for connecting a vehicle metal sheet plate and an expanded polypropylene vehicle panel, and quarter turn clip and expanded polypropylene vehicle panel assembly. The quarter turn clip is able to perform the sealing and pre-mounting functions despite it comprise neither a sealing ring in order to ensure the sealing function nor additional pre-mounting elements in order to pre-mount the quarter turn clip into the expanded polypropylene vehicle panel.

6 Claims, 4 Drawing Sheets

(56) References Cited

U.S. PATENT DOCUMENTS

| | | |
|---|---|---|
| 6,612,795 B2 | 9/2003 | Kirchen |
| 6,988,863 B2 * | 1/2006 | Hulin .................... F16B 21/02 411/3 |
| 7,955,038 B2 | 6/2011 | Silbereisen et al. |
| 2007/0189707 A1 | 8/2007 | Zakaras et al. |
| 2008/0168631 A1 | 7/2008 | Cushman |
| 2017/0073904 A1 | 3/2017 | McDowell et al. |

* cited by examiner

QUARTER TURN CLIP FOR CONNECTING A VEHICLE METAL SHEET PLATE AND AN EXPANDED POLYPROPYLENE VEHICLE PANEL AND QUARTER TURN CLIP AND EXPANDED POLYPROPYLENE VEHICLE PANEL ASSEMBLY

The present application claims foreign priority under 35 U.S.C. 119 to European Patent Office Application No. EP17382444 filed Jul. 7, 2017, the content of which is incorporated by reference herein in its entirety.

FIELD OF THE INVENTION

The present invention relates to a quarter turn clip for connecting a vehicle metal sheet plate and an expanded polypropylene vehicle panel, and to a quarter turn clip and expanded polypropylene vehicle panel assembly. The quarter turn clip is able to perform the sealing and pre-mounting functions despite it comprise neither a sealing ring in order to ensure the sealing function nor additional pre-mounting elements in order to pre-mount the quarter turn clip into the expanded polypropylene vehicle panel.

BACKGROUND OF THE INVENTION

Quarter turn clip are regularly used in the vehicle environment as quick mounting fasteners. Particularly this kind of clips is one of the available options for connecting mechanically a vehicle panel, such as a door module carrier, to the vehicle metal sheet plate.

The quarter turn clip passes through aligned apertures of the vehicle panel and the metal sheet plate and then it is rotated 90° in order to carry out the connection between them.

In this way, the vehicle panel can be connected to the vehicle metal sheet plate in a quick and simple manner.

This kind of clips should perform several functions during the mounting process such as ensuring the insertion position by aligning the clip and the hole, the angular position of the clip with regard to the hole, and also in the final mounting position ensuring the assembly tension and the sealing of the holes.

A general configuration of a quarter turn clip comprises along the longitudinal main axle of the quarter turn clip, a neck or post, and a head having two tension ramps which ensure an optimal tension in the final mounting position.

Additionally the quarter turn clip comprises elastic elements in order to connect the clip to the vehicle metal sheet plate and/or elastic elements in order pre-mount the clip to the vehicle panel and one or two sealing rings in order to ensure the sealing of the different holes.

The mounting way of the quarter turn clip depends on the specific configuration of the different parts of the clip and their relative position along the longitudinal main axle of the clip.

Thus one known example from the American patent U.S. Pat. No. 6,612,795 comprises a quarter turn clip having a head with two ramps and a post projected from the head along the main longitudinal axle of the clip. The post comprises a first portion, a first sealing ring, a second portion, a second sealing ring, a third portion and two elastic tabs angularly projected from one end of the post for connecting the quarter turn clip to the vehicle metal sheet plate. Therefore the two elastic tabs and the head with the ramps are placed at opposite sides of the sealing rings.

According to the final mounting position of the assembly, the vehicle metal sheet plate is located between the two elastic tabs and the second sealing ring and the vehicle panel is located between the head with the ramps and the first sealing ring.

Therefore the first sealing ring ensures the sealing of the hole of the vehicle panel, the second sealing ring ensures the sealing of the hole of the vehicle metal sheet plate and the head with the two ramps ensures the tension of the vehicle panel against the first sealing ring.

A drawback of the quarter turn clip described in U.S. Pat. No. 6,612,795 is the weak retention of the clip on the vehicle metal sheet plate by the two elastic tabs.

Other drawback of the quarter turn clip described in U.S. Pat. No. 6,612,795 is the difficult of mounting the assembly due to the quarter turn clip cannot be pre-mounted on the vehicle panel in such a way that the assembly formed by the vehicle panel and the quarter turn clip can be mounted on the vehicle metal sheet plate as an only assembly. It is due to the quarter turn clip does not comprises pre-mounting means of the quarter turn clip to the vehicle panel.

In order to overcome the above drawbacks, it is known the configuration of the American patent U.S. Pat. No. 7,955,038. It comprises a retention wing having a sealing ring, a neck or post and a head having two ramps and two elastic pre-mounting tabs.

The two elastic pre-mounting tabs allow pre-mounting the quarter turn clip into the vehicle panel and then this assembly is mounted on the vehicle metal sheet plate.

Then the quarter turn clip mounted on the vehicle panel is aligned with hole of the vehicle metal sheet plate and introduced through it until the head with the ramps passes through said hole.

Then, the quarter turn clip is rotated in order to the head with the ramps pushes the vehicle panel against the vehicle metal sheet plate, reaching in this way the final mounting position.

Therefore, in this case the vehicle panel and the vehicle metal sheet plate are retained in contact one with each other between the ramps and the sealing ring.

The both known quarter turn clips disclosed above have in common that both are mounted on rigid vehicle panels made of non-deformable materials having into account the forces usually applied during the mounting process of the assembly. Therefore the elasticity properties of the material of the rigid vehicle panel do not contribute to the mounting kinematics of the assembly.

The object of the invention is a quick assembly fastener and particularly a quarter turn clip for connecting a vehicle metal sheet plate and an expanded polypropylene vehicle panel being able to ensure with a more simple design, the common functions of this kind of clips when they are used in combination with non-deformable vehicle panels, that is a quarter turn clip which before the mounting process allowing a pre-mounting position of the quarter turn clip on the vehicle panel, during the mounting process ensuring the insertion position by aligning the clip and the hole, and ensuring the angular position of the clip with regard to the hole, and in the final mounting position ensuring the assembly tension and the sealing of the different holes of the vehicle metal sheet plate and the expanded polypropylene vehicle panel.

DESCRIPTION OF THE INVENTION

The present invention is established and characterised by the independent claims, while the dependent claims describe additional features thereof.

The configuration of the quarter turn clip of the invention is specially designed to collaborate with an expanded polypropylene vehicle panel in order to connect it to a vehicle metal sheet plate. That is, the vehicle panel is made of a deformable material having into account the forces usually applied during the mounting process of the assembly.

On the one hand, the hole of the expanded polypropylene vehicle panel having a diameter smaller than the diameter of the retention wing allows that the quarter turn clip does not go through the cylindrical mounting hole of the expanded polypropylene vehicle panel and therefore it is retained into the expanded polypropylene vehicle panel.

On the other hand the cylindrical mounting hole of the expanded polypropylene vehicle panel having a diameter smaller than the diameter of the cylindrical body of the quarter turn clip allows that the clip can be pre-mounted into the expanded polypropylene vehicle panel without using additional pre-mounting clips such as those used in the disclosed prior art configurations for retaining the quarter turn clip into the vehicle panel in the pre-mounting position. Therefore the expanded polypropylene vehicle panel and the quarter turn clip can be supplied as an only assembly which favours the modularity of the assembly according to a very simple and cost-effective way.

Moreover the diameter of the hole of the expanded polypropylene vehicle panel smaller than the diameter of the cylindrical body of the quarter turn clip combined with the height of the cylindrical body extended along the whole wall of the hole, results in a deformation of the material of the wall of the hole of the expanded polypropylene vehicle panel in such a way that the cylindrical body of the quarter turn clip and the wall of the hole of the expanded polypropylene vehicle panel elastically fit together.

Thus, the hole of the expanded polypropylene vehicle panel is completely sealed, both axially and radially, without using additional elements.

Therefore it is possible to keep dry the side of the expanded polypropylene vehicle panel opposite to the side of it which faces to the vehicle metal sheet plate without adding an additional sealing ring of a deformable material to the quarter turn clip.

On the other hand, the dimension $h_1$ between the first plane $p_1$ and the second plane $p_2$ smaller than the sum of the thickness $e_1$ of the vehicle metal sheet plate and the height $e_2$ of the cylindrical mounting hole of the expanded polypropylene vehicle panel, allows ensuring an optimal tension assembly when the quarter turn clip reaches the final mounting position and consequently allows ensuring the sealing of the hole of the vehicle metal sheet plate.

Both effects that is the assembly tension and the sealing of the hole of the vehicle metal sheet plate, are due to the compression exerted by the quarter turn clip according to the axial direction, against the perimeter of the hole of the expanded polypropylene vehicle panel in order to reach the final mounting position. It results in the compression of the material of the expanded polypropylene vehicle panel against the vehicle metal sheet plate and against the quarter turn clip.

In the optional case in which the tension ramps comprise error prevention surfaces it is possible to prevent an incorrect assembly of the quarter turn clip by allowing rotating the quarter turn clip according to only one direction.

In the optional case in which the neck of the quarter turn clip comprises stoppers formed by the flat parallel surfaces it is possible to stop the rotation movement of the quarter turn clip when it reaches the final mounting position due to the interference produced between these flat parallel surfaces and the two parallel sides of the non-circular mounting hole of the vehicle metal sheet plate.

Thus the mounting operator knows when the quarter turn clip has reached the final mounting position ensuring in this way the correct operation of the quarter turn clip.

DESCRIPTION OF THE FIGURES

The present specification is completed by a set of figures that illustrate a preferred embodiment and in no way limit the invention.

DETAILED DESCRIPTION OF THE INVENTION

Figure 1:
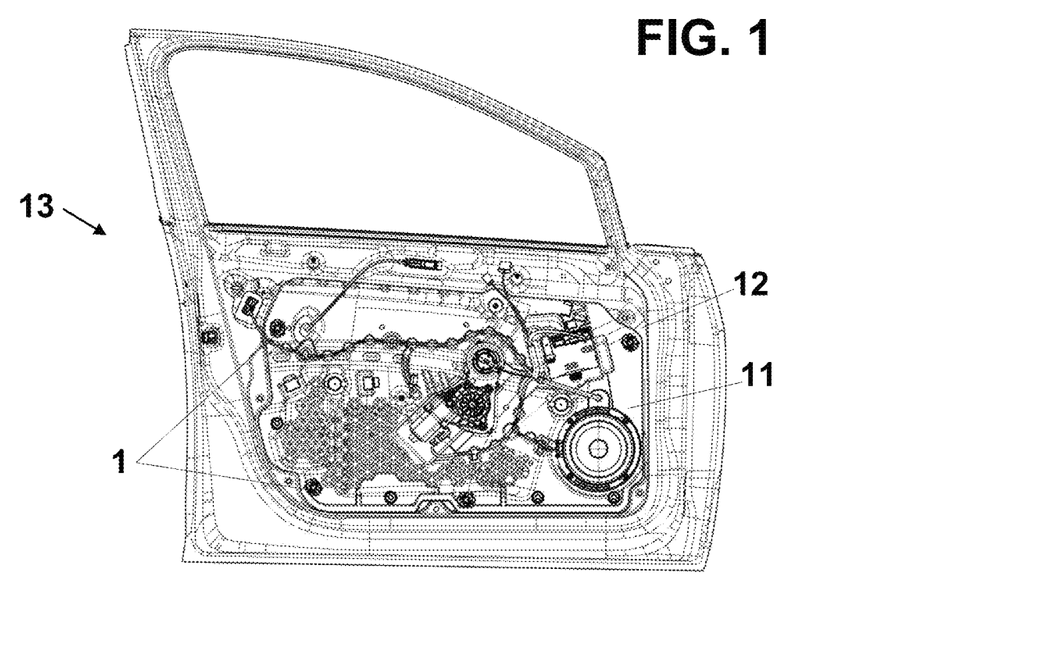
FIG. 1 shows a perspective view of a vehicle door in which it is appreciated the expanded polypropylene vehicle panel connected to the vehicle metal sheet plate by several quarter turn clips according to the invention.

FIG. 1 shows a general view of a vehicle door (13) without the door lining panel in order to see the expanded polypropylene vehicle panel (11) connected to the vehicle metal sheet plate (12) by several quarter turn clips (1) placed along the perimeter of the expanded polypropylene vehicle panel (11).

Figure 3:
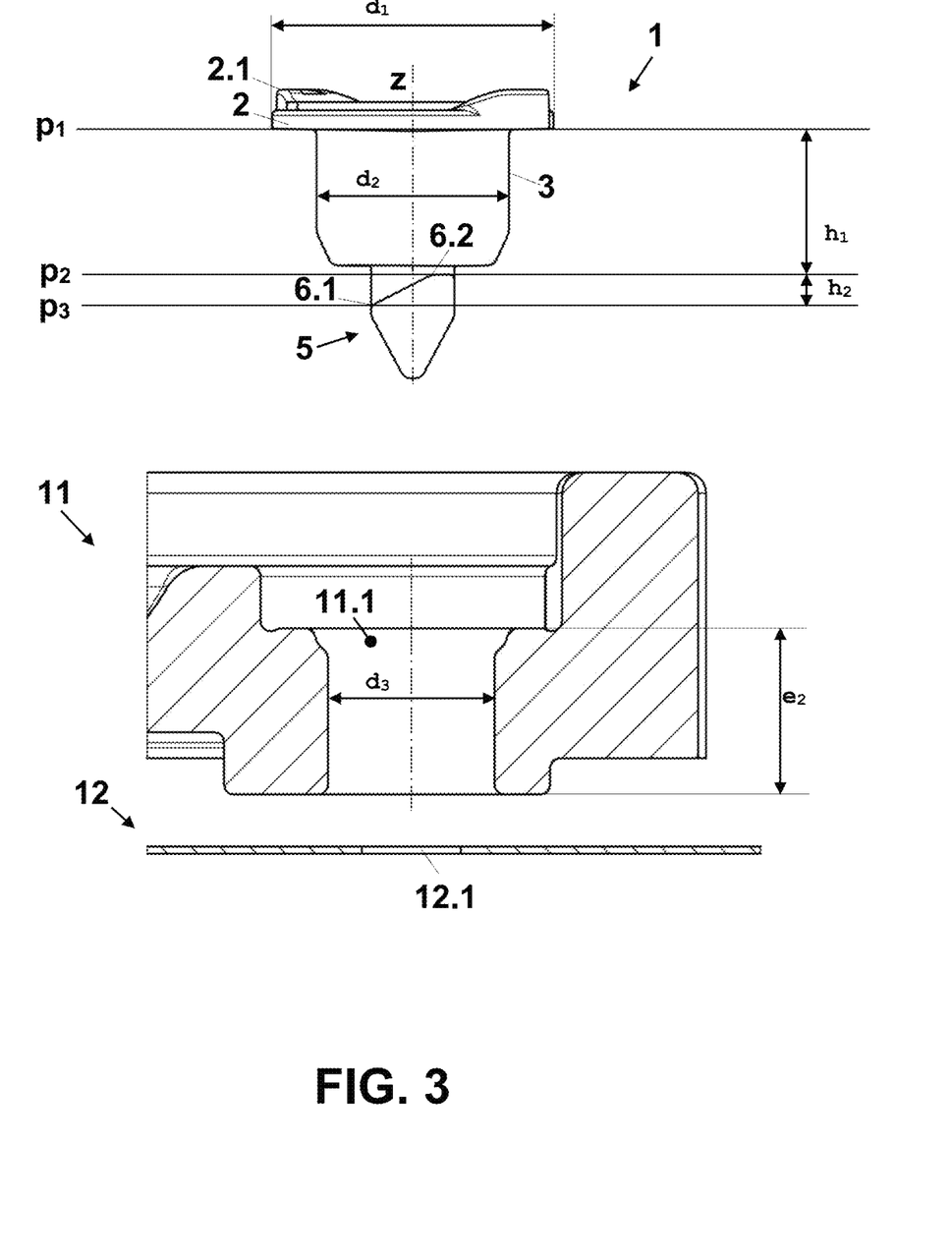
FIG. 3 shows an explosion view of the three components which form the assembly, the quarter turn clip with the different planes orthogonal to the main axle, the expanded polypropylene vehicle panel, and the vehicle metal sheet plate.

FIG. 3 shows an explosion view of the quarter turn clip (1), the expanded polypropylene vehicle panel (11) and the vehicle metal sheet plate (12) in order to see the different constituent parts of each of them.

Firstly, the vehicle metal sheet plate (12) which forms part of the vehicle door (13) structure and it is the part where the expanded polypropylene vehicle panel (11) is mounted.

It comprises a thickness $e_1$ and a non-circular mounting hole (12.1) having two parallel sides (12.1.1). The non-circular mounting hole (12.1) has a width $w_1$ and a length $l_1$. The dimensions and the shape of the non-circular mounting hole (12.1) are shown in the FIG. 4.

Secondly, the expanded polypropylene vehicle panel (11). It is made of a deformable material having into account the forces usually applied during the mounting process for connecting the expanded polypropylene vehicle panel (11) and the vehicle metal sheet plate (12) by the quarter turn clip (1).

It means that the elasticity properties of the material of the expanded polypropylene vehicle panel (11) contribute to the mounting kinematics of the assembly.

The expanded polypropylene vehicle panel (11) comprises a cylindrical mounting hole (11.1) configured to house the cylindrical body (3) of the quarter turn clip (1) described further into the text. The cylindrical mounting hole (11.1) comprises a diameter $d_3$ and a height $e_2$.

The expanded polypropylene vehicle panel (11) can be a support for other functional elements such as a window lifter, a door lock, wiring, etc. as it is shown in FIG. 1.

Thirdly, the quarter turn clip (1) which is configured to adopt a final mounting position in which it connects the expanded polypropylene vehicle panel (11) with the vehicle metal sheet plate (12).

The quarter turn clip (1) comprises:

A main axle z, which is extended longitudinally along the quarter turn clip (1).

A retention wing (2) having a length $d_1$. In this particular case depicted in the FIG. 2, the retention wing (2) has a circular shape, therefore the length $d_1$ is corresponded with the diameter of the retention wing (2). However the retention wing (2) could have other polygonal shapes.

Figure 5:
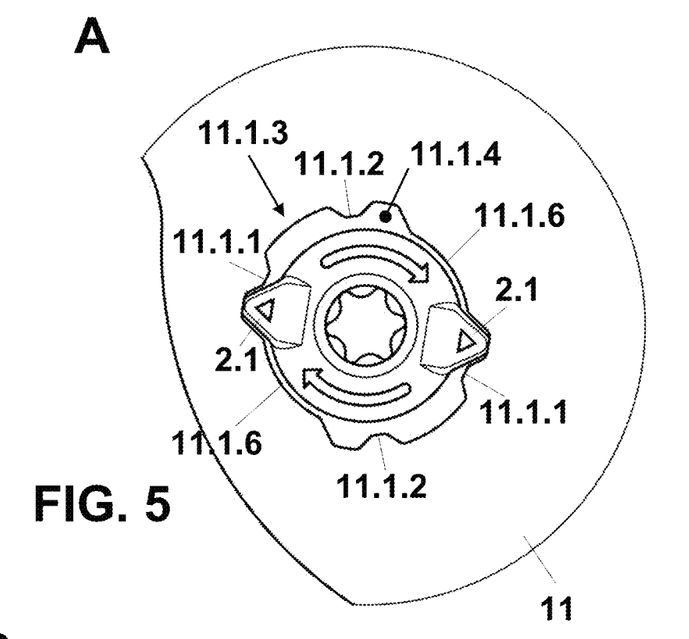
FIG. 5 shows a partial plant view of the cylindrical mounting hole area of the expanded polypropylene vehicle panel having counter detent protrusions and the retention wing of the quarter turn clip having detent protrusions according to pre-mounting position A.
Figure 6:
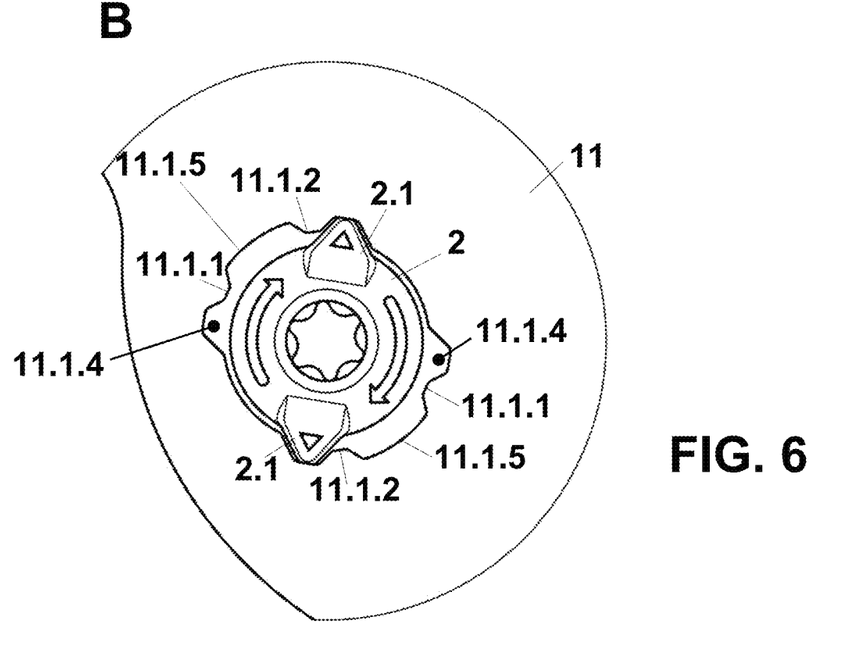
FIG. 6 shows a partial plant view of the cylindrical mounting hole area of the expanded polypropylene vehicle panel having counter detent protrusions and the retention wing of the quarter turn clip having detent protrusions according to a final mounting position B.

Optionally as it is shown in FIGS. 5 and 6, the retention wing (2) can further comprise one or more detent protrusions (2.1), which collaborate with one or more counter detent protrusions (11.1.1, 11.1.2) placed in the area of the expanded polypropylene vehicle panel (11) surrounding the cylindrical mounting hole (11.1) in order to establish one or two pre-defined positions of the quarter turn clip (1) with regard to the expanded polypropylene vehicle panel (11) in which the rotation movement of the quarter turn clip (1) respect to the main axle z is blocked:

a pre-defined pre-mounting position A in which the attaching head (5) is aligned with the non-circular mounting hole (12.1) when the expanded polypropylene vehicle panel (11) is in front of the vehicle metal sheet plate (12), in such a way that the attaching head (5) can pass through the non-circular mounting hole (12.1), a final mounting position B in which the quarter turn clip (1) connects the expanded polypropylene vehicle panel (11) and the vehicle metal sheet plate (12).

In the particular case represented in the FIGS. 5 and 6, the retention wing (2) comprises two detent protrusions (2.1) and the area of the expanded polypropylene vehicle panel (11) surrounding the cylindrical mounting hole (11.1) comprises two pair of first counter detent protrusions (11.1.1) and two pair of second counter detent protrusions (11.1.2).

Said counter detent protrusions (11.1.1, 11.1.2) are configured along a wall (11.1.3) that surrounds the cylindrical mounting hole (11.1). The wall (11.1.3) also comprises first portions (11.1.5) that allow the free movement of the detent protrusions (2.1), second portions (11.1.6) that do not allow said free movement and housings (11.1.4) in order to define a stable position of the detent protrusions (2.1), that is the housings (11.1.4) do not allow the free rotation movement of the detent protrusions (2.1) in any direction unless a enough force is applied to deform the counter detent protrusions (11.1.1).

The wall (11.1.3) is configured in such a way that each counter detent protrusion (11.1.1, 11.1.2) is between a housing (11.1.4) and a first portion (11.1.5).

Therefore one detent protrusions (2.1) collaborate with one of the first counter detent protrusions (11.1.1) in order to establish the pre-defined pre-mounting position A and with one of the second counter detent protrusions (11.1.2) in order to establish the final mounting position B and the other detent protrusions (2.1) collaborate with the other first counter detent protrusions (11.1.1) in order to establish the pre-defined pre-mounting position A and with the other second counter detent protrusions (11.1.2) in order to establish the final mounting position B.

A cylindrical body (3) connected to the retention wing (2) through a first plane $p_1$ orthogonal to the main axle z depicted in FIG. 3. The cylindrical body (3) has a diameter $d_2$ smaller than the length $d_1$ of the retention wing (2) and bigger than the diameter $d_3$ of the cylindrical mounting hole (11.1) in such a way that when the cylindrical body (3) is inside the cylindrical mounting hole (11.1), they elastically fit together.

A neck (4) connected to the cylindrical body (3). Optionally it can comprises two stoppers (4.1) formed by two flat surfaces, parallel either, to the main axle z, and each other, and wherein the stoppers (4.1) are configured to contact the parallel sides (12.1.1) of the non-circular mounting hole (12.1) in order to stop the rotation movement of the quarter turn clip (1) in the final mounting position.

An attaching head (5) insertable through the non-circular mounting hole (12.1) of the vehicle metal sheet plate (12) in the pre-mounting position and connected to the neck (4). The attaching head (5) has a main body (5.1) which comprises a width $w_2$ smaller than the width $w_1$ and a length $l_2$ smaller than the length $l_1$. The dimensions of the main body $w_2$ and $l_2$ correspond to the section of the main body (5.1) according to the plane $p_3$ orthogonal to the main axle z depicted in FIG. 3.

The attaching head (5) further comprises two tension ramps (6) wherein each of them comprises a final mounting edge (6.2) in a second plane $p_2$ orthogonal to the main axle z and parallel to the plane $p_1$, and a starting mounting edge (6.1) in a third plane $p_3$ orthogonal to the main axle z and parallel to the plane $p_1$. Optionally the tension ramps (6) further have error prevention surfaces (6.3) configured to contact the parallel sides (12.1.1) of the non-circular mounting hole (12.1) in order to prevent an incorrect assembly of the quarter turn clip (1) by allowing rotating the quarter turn clip (1) according to only one direction defined by the orientation of the tension ramps (6).

Figure 2:
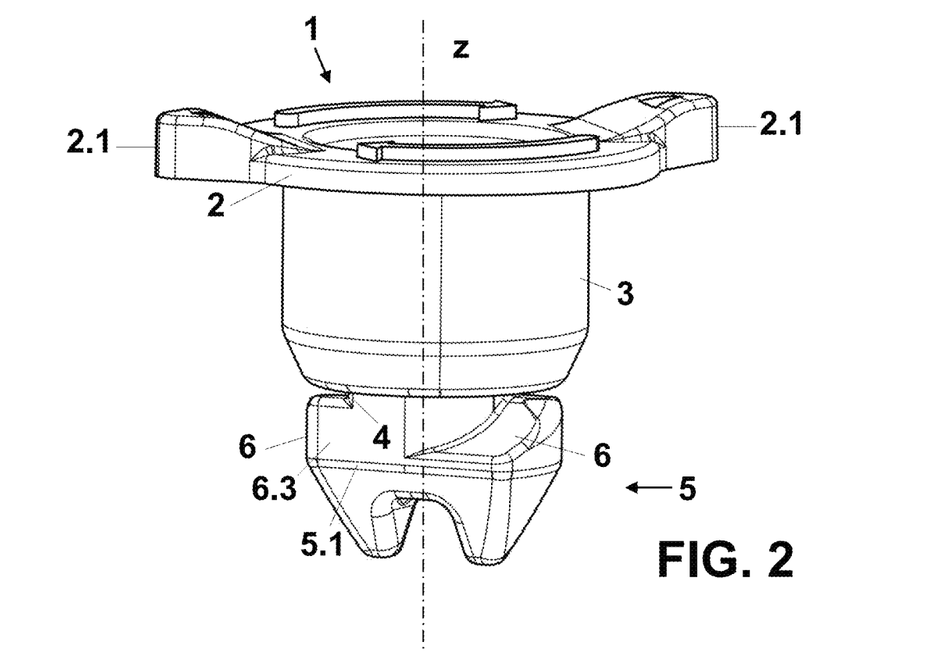
FIG. 2 shows a perspective view of the quarter turn clip with its different main parts.

The free end of the attaching head (5) can comprises a pointy shape, as it can be seen in the FIGS. 2 and 3, in order to facilitate the insertion of the attaching head (5) first through the cylindrical mounting hole (11.1) of the expanded polypropylene vehicle panel (11), and then through the non-circular mounting hole (12.1) of the vehicle metal sheet plate (12).

Figure 4:
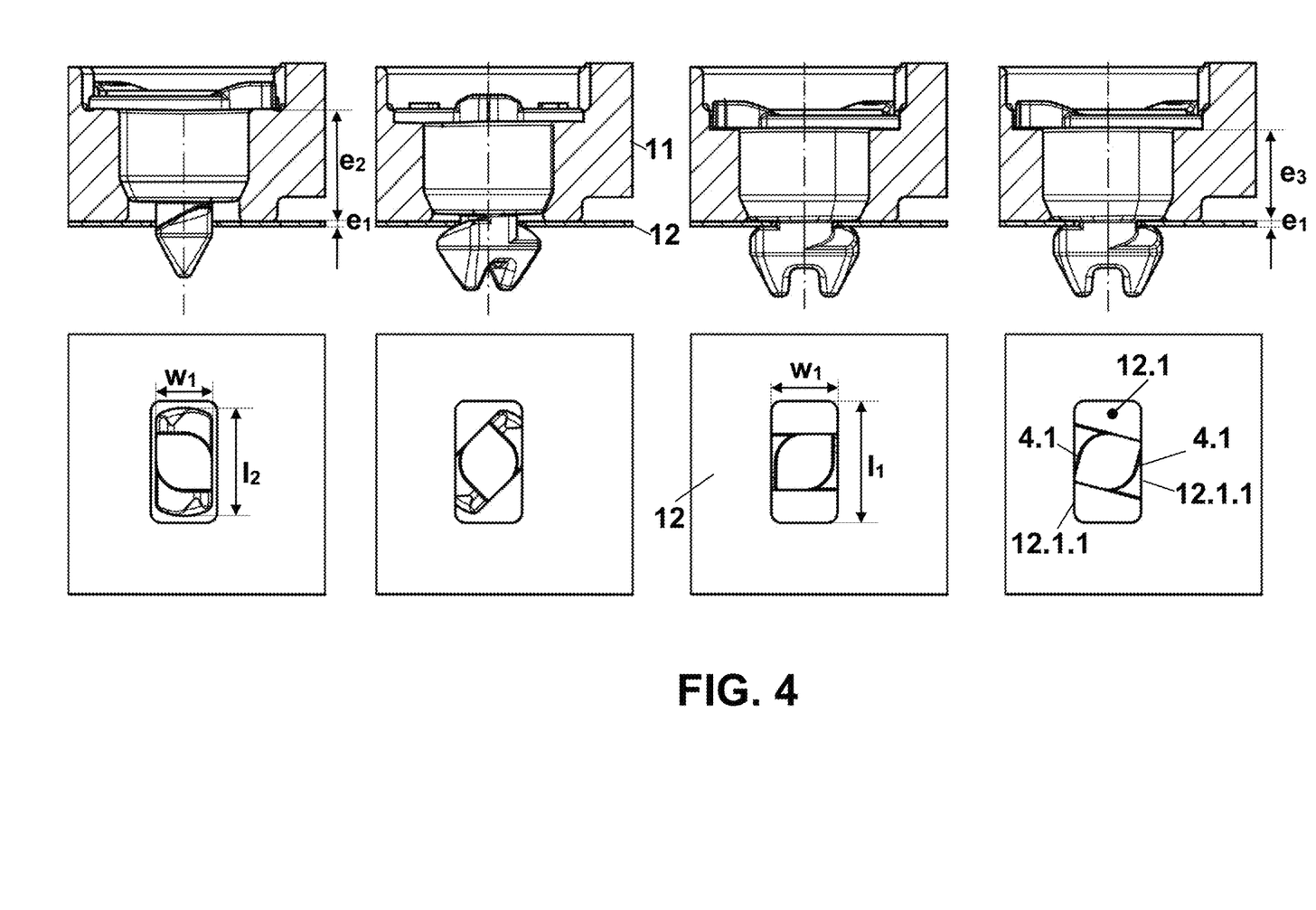
FIG. 4 shows the different steps of the mounting process for connecting the expanded polypropylene vehicle panel and the vehicle metal sheet plate by the quarter turn clip of the invention.

FIG. 4 shows the different steps of the connecting process of the expanded polypropylene vehicle panel (11) and the vehicle metal sheet plate (12) by the quarter turn clip (1) of the invention, once the quarter turn clip (1) has been inserted through the two holes, that is, first through the cylindrical mounting hole (11.1) of the expanded polypropylene vehicle panel (11), and then through the non-circular mounting hole (12.1) of the vehicle metal sheet plate (12).

Before inserting the quarter turn clip (1) through the non-circular mounting hole (12.1) of the vehicle metal sheet plate (12), it is inserted through the cylindrical mounting hole (11.1) of the expanded polypropylene vehicle panel (11).

Due to the diameters $d_2$ and $d_3$ explained above, when the cylindrical body (3) is inside the cylindrical mounting hole (11.1) they are fitted together, therefore the quarter turn clip (1) can be pre-mounted into the expanded polypropylene vehicle panel (11) according to a predefined position which allows inserting the attaching head (5) through the non-circular mounting hole (12.1) of the vehicle metal sheet plate (12).

Thus both the expanded polypropylene vehicle panel (11) and the quarter turn clip (1) can be supplied as an only assembly, in this way facilitating the connecting process of the expanded polypropylene vehicle panel (11) with the vehicle metal sheet plate (12).

According to an improvement of the invention disclosed above in which the retention wing (2) comprises one or more detent protrusions (2.1) which collaborate with one or more a counter detent protrusions (11.1.1, 11.1.2) of the cylindrical mounting hole area of the expanded polypropylene vehicle panel (11), the quarter turn clip (1) is retained in the cylindrical mounting hole (11.1) due to the interference produced between the detent protrusions (2.1) with first counter detent protrusions (11.1.1). In this way the rotation movement of the quarter turn clip (1) respect to the main axle z is blocked.

Thus it is possible to establish a pre-defined mounting position A represented in the FIG. 5, of the quarter turn clip (1) with regard to the expanded polypropylene vehicle panel (11) in which the attaching head (5) of the quarter turn clip (1) is aligned with the non-circular mounting hole (12.1) when the expanded polypropylene vehicle panel (11) is in front of the vehicle metal sheet plate (12), in such a way that the attaching head (5) can pass through the non-circular mounting hole (12.1).

In this way the operator can check visually that the quarter turn clip (1) is pre-mounted in the correct position in the expanded polypropylene vehicle panel (11).

Then the quarter turn clip (1) mounted in the expanded polypropylene vehicle panel (11) according to the pre-defined mounting position A, is aligned with the non-circular mounting hole (12.1) of the vehicle metal sheet plate (12) and introduced through it until the attaching head (5) with the tension ramps (6) passes through said hole (12.1).

Then, the quarter turn clip (1) is rotated a quarter turn in order to connect both, expanded polypropylene vehicle panel (11) and the vehicle metal sheet plate (12) by the interference between the attaching head (5) and the area of the vehicle metal sheet plate (12) surrounding the non-circular mounting hole (12.1).

In the optional case in which the retention wing (2) comprises detent protrusions (2.1) which collaborate with counter detent protrusions (11.1.1) of the cylindrical mounting hole (11.1) area, when the rotation movement starts, the first counter detent protrusions (11.1.1) are deformed by the detent protrusions (2.1) in order to overcome the interference produced by said first counter detent protrusions (11.1.1) and thus allowing the rotation movement of the quarter turn clip (1) respect to the main axle z.

The interference produced by the first counter detent protrusions (11.1.1) is overcame due to the quarter turn clip (1) is made of a more rigid material than the material of the expanded polypropylene vehicle panel (11) and the material of the expanded polypropylene vehicle panel (11) is made of a deformable material having into account the forces usually applied during the mounting process of the assembly.

During the rotation step of the quarter turn clip (1), first the starting mounting edge (6.1) of the tension ramps (6) comes into contact with the area of the vehicle metal sheet plate (12) placed around the non-circular mounting hole (12.1).

As the rotation movement of the quarter turn clip (1) continues, the expanded polypropylene vehicle panel (11) is pushed against the vehicle metal sheet plate (12) due to the tension ramps (6) until the final mounting edge (6.2) of the tension ramps (6) comes into contact with the area of the vehicle metal sheet plate (12) placed around the non-circular mounting hole (12.1), thus completing the mounting process.

Optionally, in order to stop the rotation movement of the quarter turn clip (1) when it reaches the final mounting position, the optional stoppers (4.1) formed by the flat parallel surfaces of the neck (4) come into contact with the two parallel sides (12.1.1) of the non-circular mounting hole (12.1) of the vehicle metal sheet plate (12) and stop the rotation movement of the quarter turn clip (1) due to the interference produced between the flat parallel surfaces of the neck (4) and the two parallel sides (12.1.1) of the non-circular mounting hole (12.1).

In the optional case in which the retention wing (2) comprises detent protrusions (2.1) which collaborate with second counter detent protrusions (11.1.2) of the cylindrical mounting hole (11.1) area, it is possible to define the final mounting position B represented in the FIG. 6, in which the quarter turn clip (1) connects the expanded polypropylene vehicle panel (11) and the vehicle metal sheet plate (12).

According to this optional configuration, when the quarter turn clip (1) reaches the second counter detent protrusions (11.1.2), they are deformed by the detent protrusions (2.1) in order to overcome the interference produced by said second counter detent protrusions (11.1.1) and thus allowing reaching the final mounting position B of the assembly.

In this way the operator can check visually that the quarter turn clip (1) has reached the final mounting position B represented in the FIG. 6.

As it can be seen in FIG. 4 the expanded polypropylene vehicle panel (11) and the vehicle metal sheet plate (12) are retained in contact one with each other between the tension ramps (6). Therefore in the final mounting position one side of the vehicle metal sheet plate (12) is in contact with the expanded polypropylene vehicle panel (11) and the opposite side of the vehicle metal sheet plate (12) is in contact with the final mounting edges (6.2) of the tension ramps (6).

As FIGS. 3 and 4 show, the distance $h_1$ between the first plane $p_1$ and the second plane $p_2$ is smaller than the sum of the thickness $e_1$ and the height $e_2$.

Therefore, in order to the quarter turn clip (1) reaches the final mounting position, the expanded polypropylene vehicle (11) panel is compressed by the quarter turn clip (1) according to the axial direction, in such a way that the cylindrical mounting hole (11.1) has a height $e_3$ smaller than the height $e_2$ due the compression exerted by the quarter turn clip (1) in order to complete the mounting process. In this way the assembly tension is ensured.

The present invention also relates to a quarter turn clip (1) and expanded polypropylene vehicle panel (11) assembly for mounting on a vehicle metal sheet plate (12) wherein each of the three components has the features disclosed above.

The invention claimed is:

1. A quarter turn clip, expanded polypropylene vehicle panel, and a vehicle metal sheet plate assembly wherein, the quarter turn clip is configured for connecting the vehicle metal sheet plate and the expanded polypropylene vehicle panel, wherein the vehicle metal sheet plate comprises a thickness e1 and a non-circular mounting hole having two parallel sides, a width w1 and a length l1,
wherein the expanded polypropylene vehicle panel comprises a cylindrical mounting hole with a diameter d3 and a height e2, wherein said quarter turn clip is configured to adopt a final mounting position in which the quarter turn clip connects the expanded polypropylene vehicle panel with the vehicle metal sheet plate, and wherein said quarter turn clip comprises:
- a main axle z,
- a retention wing having a length d1,
- a cylindrical body connected to the retention wing through a first plane p1 orthogonal to the main axle z, wherein the cylindrical body has a diameter d2 smaller than d1 and bigger than d3 in such a way that when the cylindrical body is inside the cylindrical mounting hole, they elastically fit together,
- a neck connected to the cylindrical body,
- an attaching head insertable through the non-circular mounting hole of the vehicle metal sheet plate and connected to the neck, wherein said attaching head has a main body which comprises a width w2 smaller than the with w1 and a length l2 smaller than the length l1 and two tension ramps wherein each of them comprises a final mounting edge in a second plane p2 orthogonal to the main axle z and parallel to the plane p1, and a starting mounting edge in a third plane p3 orthogonal to the main axle z and parallel to the plane p1, wherein the cylindrical mounting hole is configured to house the cylindrical body (3) of the quarter turn clip, wherein the distance h1 between the first plane p1 and the second plane p2 is smaller than the sum of the thickness e1 and the height e2, wherein in the final mounting position the expanded polypropylene vehicle panel is compressed in such a way that the cylindrical mounting hole has a height e3 smaller than the height e2 due the compression exerted by the quarter turn clip, and wherein in the final mounting position one side of the vehicle metal sheet plate is in contact with the expanded polypropylene vehicle panel and the opposite side of the vehicle metal sheet plate is in contact with the final mounting edges of the tension ramps.

2. The quarter turn clip for connecting a vehicle metal sheet plate and an expanded polypropylene vehicle panel according to claim 1, wherein the neck comprises two stoppers formed by two flat surfaces, parallel either, to the main axle z, and each other, and wherein the stoppers are configured to contact the parallel sides of the non-circular mounting hole in the final mounting position.

3. The quarter turn clip for connecting a vehicle metal sheet plate and an expanded polypropylene vehicle panel according to claim 1, wherein the tension ramps (6) has an error prevention surface configured to contact the parallel sides of the non-circular mounting hole in order to prevent an incorrect assembly of the quarter turn clip (1) by allowing rotating the quarter turn clip according to only one direction.

4. The quarter turn clip for connecting a vehicle metal sheet plate and an expanded polypropylene vehicle panel according to claim 1, wherein the retention wing comprises a detent protrusion and the area of the expanded polypropylene vehicle panel surrounding the cylindrical mounting hole comprises a counter detent protrusion in order to establish a pre-defined position of the quarter turn clip with regard to the expanded polypropylene vehicle panel in which the rotation movement of the quarter turn clip respect to the main axle z is blocked.

5. The quarter turn clip for connecting a vehicle metal sheet plate and an expanded polypropylene vehicle panel according to claim 4, wherein the area of the expanded polypropylene vehicle panel surrounding the cylindrical mounting hole comprises a first counter detent protrusion (11.1.1) in order to establish a pre-defined pre-mounting position A in which the attaching head is aligned with the non-circular mounting hole when the expanded polypropylene vehicle panel is in front of the vehicle metal sheet plate, in such a way that the attaching head can pass through the non-circular mounting hole.

6. The quarter turn clip for connecting a vehicle metal sheet plate and an expanded polypropylene vehicle panel according to claim 4, wherein the area of the expanded polypropylene vehicle panel surrounding the cylindrical mounting hole comprises a second counter detent protrusion in order to establish a final mounting position B in which the quarter turn clip connects the expanded polypropylene vehicle panel and the vehicle metal sheet plate.

* * * * *